United States Patent Office 2,718,876
Patented Sept. 27, 1955

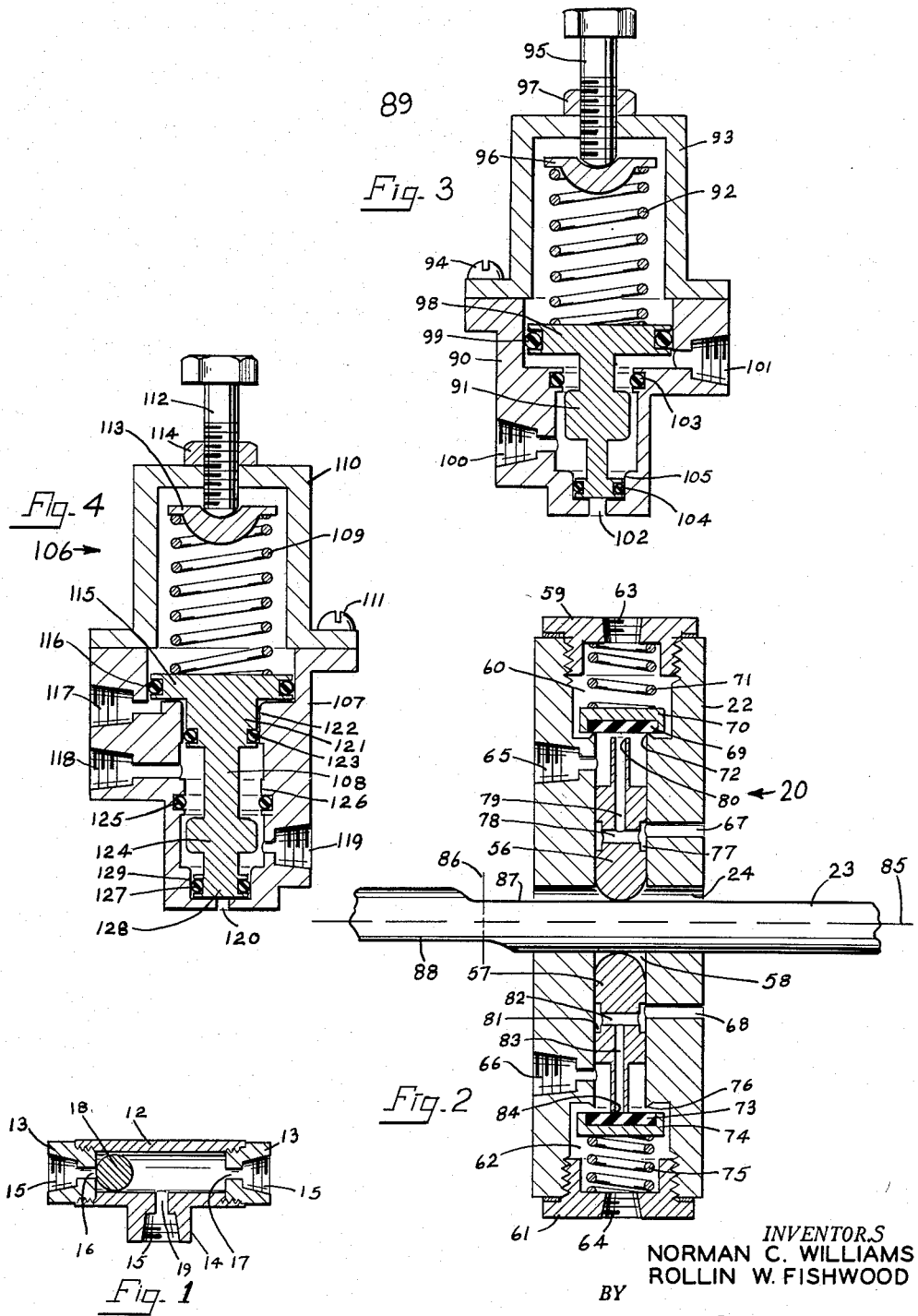

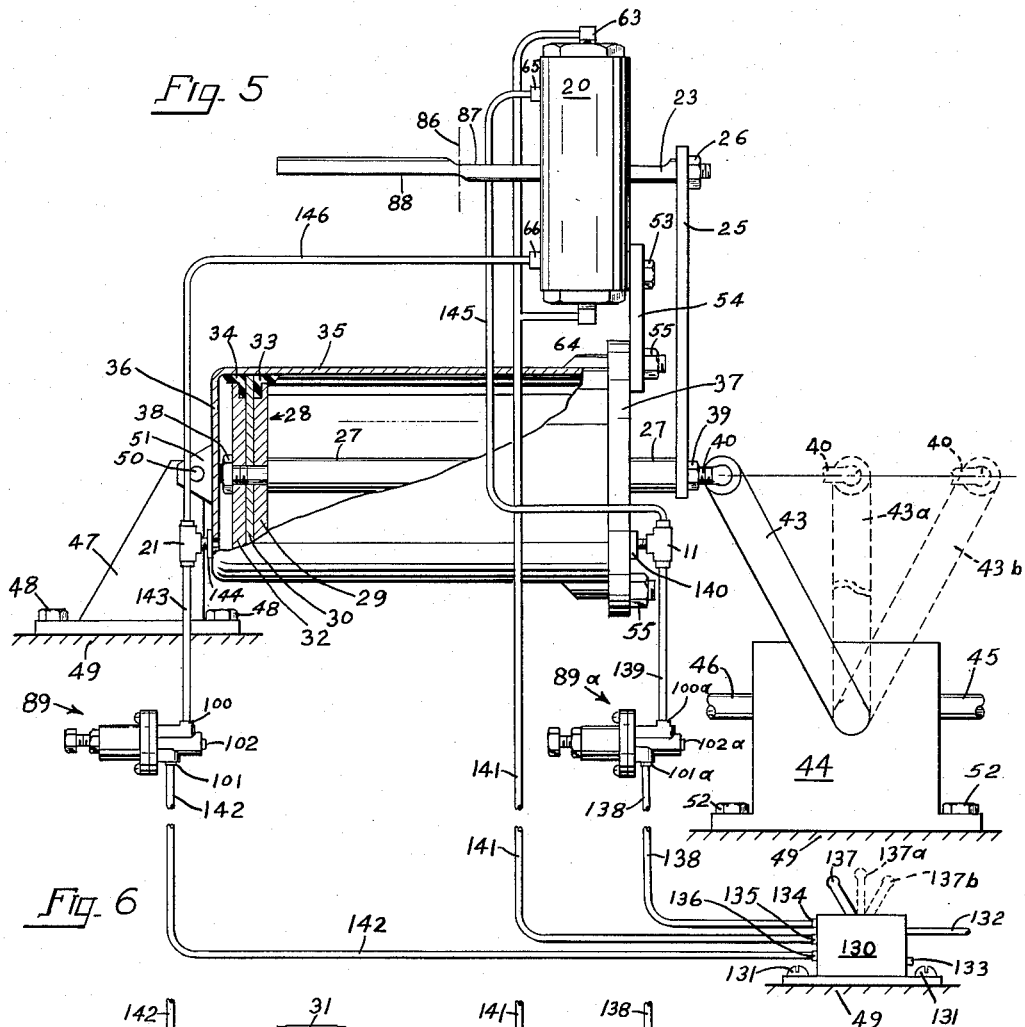
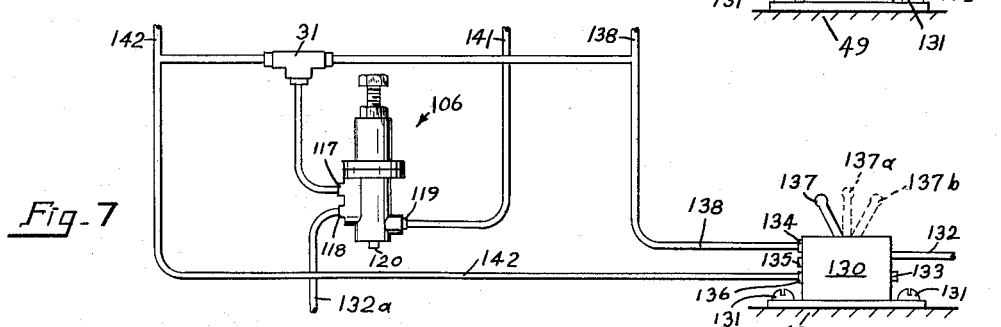

2,718,876

REMOTE POSITIONING MEANS

Norman C. Williams, Portland, Oreg., and Rollin W. Fishwood, Vancouver, Wash., assignors to Power Brake Equipment Company, Portland, Oreg., a corporation of Oregon Application September 2, 1954, Serial No. 453,746

6 Claims. (Cl. 121—38)

This invention relates generally to master and slave mechanism systems of the type in which a master switch requiring little power is used to position a remote power operated mechanism. In the preferred form of the invention here disclosed the useful mechanism to be operated is indicated to be the forward, neutral and reverse drive selecting transmission of a boat propelling motor, the transmission operating means is a three position pneumatically operated piston in a cylinder, the remote control means is a three position pneumatic valve or the equivalent thereof, and the invention comprises the unique and useful combination of these elements with unique and useful control elements and the required pneumatic circuit connections.

Mechanisms for this general type of operation are old in the art as, for instance, the electrically controlled fluid pressure actuated mechanism of Naud U. S. Patent No. 2,604,075 over which the present invention is an improvement to meet the increasing demands of the users.

It is the primary object of this invention to provide the required elements and the combined mechanism for the above disclosed purpose which will have no electrical parts to deteriorate in marine use, which is simple and easy to service, which will operate smoothly without shock to the operated parts, and which has a minimum of long connecting power conduits connecting the remote parts.

It is a second object to provide the new and useful control devices required for the improved system.

How these and other objects are attained is explained in the following description referring to the attached drawings in which:

Figure 1 is a sectional elevation view of a two-way check valve.

Figure 2 is a sectional elevation view of a neutral finding and directional control valve.

Figure 3 is a sectional elevation view of an automatic pressure limiting and relaxing valve.

Figure 4 is a sectional elevation view of an automatic neutral return valve.

Figure 5 is a schematic showing of the functional connections of the elements of the system adjacent the mechanism to be controlled.

Figure 6 is a schematic showing of the functional connections of the elements of one form of remote control through which the invention may be practiced.

Figure 7 is a schematic showing of the functional connection of the elements of another form of remote control.

Like numerals of reference refer to like parts in the several figures of the drawing.

As seen in Figure 1 the two-way check valve used at 11, 21 and 31 of Figures 5 and 7 includes a hollow T-shaped body 12 with identical plugs 13 threaded into opposite ends thereof. Both plugs 13 and the T-leg 14 are centrally drilled and tapped as at 15 to receive standard tube to pipe connectors. At their inner ends the central holes through plugs 13 form check valve ports 16, 17 adapted to be closed by ball valve 18 freely rollable within the interior of body 12. It is seen that if air pressure is exerted through either of the plugs 13 the ball valve 18 will move to close the port (16 or 17) in the opposite plug and air will flow through the body 12 and out the T-port 19 only.

As seen in Figure 2 the neutral finding and directional control valve 20 shown at 20, in Figure 5 comprises a pair of substantially identical valve mechanisms symmetrically arranged within the body 22 about operating bar 23 adapted to pass freely through a transverse hole 24 formed through body 22. As shown in Figure 5 bar 23 is reduced in size and threaded at its right end to pass through a hole formed in the upper end of rigid link bar 25 and to be rigidly secured thereto by nut 26. The other end of link bar 25 is rigidly secured to piston rod 27 of piston 28 made up of plate disks 29, 30 and 32 between the outer edges of which are secured piston packing elements 33, 34 adapted to seal piston 28 to the inner wall of power cylinder 35 closed at one end by integral head 36 and at the other by removable head 37 through a central hole in which rod 27 is slidably sealed. The inner end of piston rod 27 is reduced in diameter and threaded to pass through a central hole in piston 28 and be secured thereto by nut 38. The outer end of rod 27 is reduced in diameter and threaded to pass through a hole formed in link bar 25 to be secured thereto by nut 39. Link bar 25 is formed with an offset angular extension 40 pivoted to operating lever 43 of the transmission 44 adapted to receive power from rotating engine shaft 45 and to rotate propeller shaft 46 in the forward moving direction if lever 43 is in its position shown at 43b, in the rearward moving direction if lever 43 is in its position shown at 43 or to disconnect shaft 46 from shaft 45 if lever 43 is in its position shown at 43a.

Bracket 47 secured to the boat structure 49 by bolts 48 is formed at its upper end with a bearing hole therethrough adapted to receive pin 50 pivotally mounting on bracket 47 the bearing boss 51 extending rearwardly from rear cylinder head 36. Transmission 44 is secured to boat structure 49 by bolts 52.

Control 20 is secured by cap screw 53 to support plate 54 which in turn is secured to cylinder head 37 by cylinder head nuts 55 which also secure cylinder head 37 to cylinder 35.

From Figure 5 it is seen that valve operating bar 23 is secured to power piston rod 27 to remain axially parallel thereto and always to move longitudinally in either direction therewith and axially through transverse hole 24 in control valve body 22 to position valve operating pistons 56, 57 slidably guided in hole 58 formed centrally vertically through body 22 normal to rod 23 whose axis intersects the axis of hole 58. See Figure 2.

Hole 58 through body 22 is enlarged at each outer end and internally threaded to receive at one end plug 59 to complete the closure of valve chamber 60 and at the other end plug 61 to complete the closure of valve chamber 62. Plugs 59 and 61 are center tapped at 63, 64 respectively to receive tube to pipe tap fittings. Pipe tapped holes 65, 66 and exhaust port holes 67, 68 are formed through the walls of body 22 to central hole 58 as shown.

Valve 69 in valve cup 70 is biased as shown by spring 71 toward valve seat 72 formed around the end of hole 58 at its entrance to chamber 60. Valve 73 in valve cup 74 is biased as shown by spring 75 toward valve seat 76 formed around the end of hole 58 at its entrance to chamber 62.

Valve operating piston 56 is reduced in diameter at 77 for a sufficient length to cause exhaust port 67 always to be in communication with transverse hole 78 and intersecting longitudinal hole 79 the upper end of the wall of which forms exhaust valve seat 80. Valve operating piston 57 is reduced in diameter at 81 for a sufficient length to cause exhaust port 68 always to be in communication with transverse hole 82 and intersecting longitudinal hole 83 the lower end of the wall of which forms exhaust valve seat 84.

Operating bar 23 is formed from a metal bar of circular section about its axis 85 and has an operating neutral position at 86. To the right of 86 the top of bar 23 is cut off to form a flat horizontal land 87 while to the left of 86 the bottom of bar 23 is cut off to form a flat horizontal land 88. It is seen that when bar 23 is moved to right of the position shown in Figure 2 until line 86 reaches the axis of pistons 56, 57 then both pistons will take the position shown with respect to their respective valves as shown in the drawing for valve 69 and piston 56. Then further movement of bar 23 to the right will cause piston 56 to raise off of land 87 to the normal top of bar 23 first closing exhaust valve seat 80 into closing contact on valve 69 and then raising valve 69 from valve seat 72 to place pipe connection 65 into communication with pipe connection 63.

Referring now to Figure 3, pressure limiting and relaxing valve 89 positioned in the systems 89, 89a as shown in Figure 5, includes an internally stepped valve cylinder 90 in which is guidably sealed for longitudinal operation a valve piston 91. Spring 92 enclosed by cover 93 secured to cylinder 90 by screws 94 is adjustably strained by adjusting screw 95 and spring cap 96 to bias piston 91 downwardly. Lock nut 97 secures screw 95 in a selected position. Head 98 of piston 91 is slidably sealed to the inner wall of cylinder 90 by O-ring 99. Through the wall of cylinder 90 are formed two pipe tapped holes 100, 101 and an exhaust port 102. O-ring 103 set into the wall of cylinder 90 forms a valve seat adapted to cooperate with piston 91 to form a shut off valve between holes 100, 101. O-ring 104 set into the lower head of piston 91 forms an exhaust valve adapted to cooperate with the lower reduced diameter interior 105 of cylinder 90 to connect hole 100 to exhaust port 102 after piston 91 has moved upwardly to close valve 91—103.

The positions shown in Figure 3 for the parts of valve 89 are for the unactivated condition or when no air pressure is applied. Starting from this condition if air pressure is applied at the inlet 101 it is seen that air will pass open valve 91—103 and pass out outlet 100 until the pressure under piston head 98 builds up to a value determined by the setting of adjusting screw 95 at which pressure the bias of spring 92 will have been sufficiently overcome to raise piston 91 to close valve 91—103. At this point exhaust valve 104—105 is still closed but as the stoppage of air flow through valve 91—103 causes the pressure of air from inlet 101 to build up under piston head 98 piston 91 moves further upward keeping valve 91—103 closed but opening exhaust valve 104—105 and exhausting air from outlet 100 to atmosphere through exhaust port 102.

Now referring to Figure 4, automatic neutral return valve 106 positioned at 106 in Figure 7 includes an internally stepped valve cylinder 107 in which is guidably sealed for longitudinal operation a valve piston 108. Spring 109 enclosed by cover 110 secured to cylinder 107 by screw 111 is adjustably strained by adjusting screw 112 and spring cap 113 to bias piston 108 downwardly. Lock nut 114 secures screw 112 in a selected position. Head 115 of piston 108 is slidably sealed to the inner wall of cylinder 107 by O-ring 116. Through the wall of cylinder 107 are formed three pipe tapped holes 117, 118, 119 and an exhaust port 120 leading to the interior of cylinder 107. The upper working section 121 of piston 108 is always sealed to the upper working section 122 of cylinder 107 by O-ring 123. The intermediate section 124 of piston 108 is adapted to cooperate with O-ring 125 set into wall section 126 of cylinder 107 to form a valve capable of blocking the path through the cylinder between holes 118—119. O-ring 127 set into the lower working section 128 of piston 108 cooperates with cylinder bore 129 to form an exhaust valve between hole 119 and exhaust port 120. As shown in Figure 4, exhaust valve 127—129 is closed thereby isolating exhaust port 120, valve 124—125 is open thereby allowing a free path from hole 118 to hole 119. As air is introduced into cylinder 107 through connection 117 to oppose the bias of spring 109 on piston 108 piston 108 will rise, first closing valve 124—125, then opening exhaust valve 127—129.

Having thus explained the structure and operation of the working elements of the invention, the circuits and operation of the system will be described with reference to Figures 5 and 6 in which the locations of the Figures 1, 2 and 3 devices have been indicated. In Figure 6 is shown a remote master air control valve 130 of a common type secured to the boat structure 49 by screws 131. This master valve is under air pressure at all times from air line 132 and is formed with an exhaust port 133 and three operating ports 134, 135 and 136. In each of the three positions 137, 137a and 137b of lever 137 of master valve 130 one of the ports 134, 135 or 136 is connected to the air line 132 and the other two ports are connected to the exhaust port 133.

In the position 137 as shown in Figure 6 lever 137 has operated master control 130 to connect air line 132 with outlet port 134, flexible tubing 138, and air inlet port 101a of valve 89a. Valve 89a has passed actuating air through and out outlet 100a, tubing 139, and two way check valve 11 to inlet port 140 in head 37 of power cylinder 35 thus putting pressure on power piston 28 which has moved to the left, to the position shown in Figure 5, taking with it piston rod 27 and lever 43 to the reverse drive position of transmission 44. In the meantime piston 91 of valve 89a has moved upwardly to close valve 91—103 to limit the pressure applied to the power cylinder 35 and then to open valve 104—105 to relax the pressure in cylinder 35 by exhausting line 139 to atmosphere.

During this operation master control ports 135 and 136 and their connected lines 141 and 142 are exhausted to atmospheric pressure through master control port 133, no air pressure has been impressed on neutral valve 20 and no air pressure has been on relaxing valve 89, line 143, check valve 21, or through port 144 in head 36 to the left end of power cylinder 35. Therefore the power piston 28 and transmission lever 43 will stay in the position shown while control lever 137 remains in the position 137 as shown.

Now if it is desired to go at once to the forward direction of boat movement, master lever 137 is thrown over to the forward position 137b and air pressure from line 132 is impressed on line 142 while lines 138 and 141 are exhausted to atmosphere. Valve 89 is operated as above described for valve 89a and air under limited pressure is first applied to the left end of cylinder 35 and then relaxed causing piston 28 to move easily to the right carrying lever 43 of transmission 44 to the position 43b to connect the propeller shaft 46 to drive shaft 45 for forward movement of the boat.

Should it next be desired to disconnect the propeller shaft from the drive shaft to stop propulsion of the boat, master control level 137 is shifted to the neutral position 137a putting line 141 under pressure and exhausting lines 138 and 142. When this is done it is seen from Figure 5 that the circuits between master control 130 up to check valves 11 and 21 are at atmospheric pressure and are blocked by check valves 11 and 21 from receiving air from above the valves. Also actuating air is impressed through tube 141 onto both connections 63, 64 of neutral valve 20. As seen in Figures 2 and 5 the drive mechanism is in the reverse direction so that bar 23 is positioned to the left with piston rod 27 leaving neutral control 20 to the right of the neutral position 86 of bar 23. In this position valve operating piston 56 rides down on land 87 of bar 23 and allows valve 69—72 to close thereby blocking line 141 at inlet 63 and exhausting line 145 above check valve 11 to atmosphere through connection 65 and exhaust valve 69—80 of neutral control 20. However as shown valve operating piston 57 in control 20 is riding against the bias of spring 75 on the outer diameter of bar 23 at its lower side and exhaust valve 73—84 is closed while valve 73—76 is open to put air under pressure from connection 64 of line 141 through valve 73—76 into connection 66 of line 146 where it is blocked from line 143 by check valve 21 but effective through the T opening in check valve 21 to enter the left end of power cylinder 35 through connection 144 to push piston 28 to the right carrying with it piston rod 27, transmission lever 43 and operating bar 23. As operating bar 23 moves to the right and nears the neutral position where the center line of neutral control 20 is coincident with neutral line 86 of bar 23 valve operating piston 57 moves upwardly until at line 86 piston 57 rests on land 88 of bar 23, valve 73—76 is closed to block further air input to the power cylinder and exhaust valve 73—84 is opened to relax the air pressure in the power cylinder by exhausting the cylinder to atmosphere. It should be noted that after valve 73—76 closes under the bias of spring 75 then the back pressure of air from the power cylinder through line 146 and connection 66 under valve piston 57 continues to raise the piston to open exhaust valve 73—84.

It is thus seen that regardless of the positions 137, 137a or 137b in which control level 137 may be the transmission lever 43 will be in an analogous position 43, 43a or 43b, and if lever 43 is moved to another desired position lever 137 will follow at once to its equivalent position. Also it should be noted that the present system is such that in its action toward either the forward or reverse position the power fluid is fed to the power cylinder through one of the pressure limiting and relaxing valves 89, 89a so that the power piston is not slammed to the end of its stroke in a destructive way. In returning to the neutral position the power piston is under the exact control of neutral control mechanism 20.

It sometimes occurs in the installation of these systems that there is a considerable distance between the remote master control and the power operating mechanism and it is desirable both for economy and to avoid confusion to require only two lines instead of three between the two locations. This invention provides for this situation by combining the elements of Figure 7 with the elements of Figure 5 rather than to combine the elements of Figures 5 and 6 as above described.

Combining Figures 5 and 7 it should be noted that the neutral air connection 135 from master control 130 is not used but that neutral air pressure line 141 is connected to a separate air supply line 132a through an auxiliary neutral valve 106 described above with reference to Figure 4. New air line 132a is connected to control 106 at 118, neutral line 141 is connected to control 106 at 119 and a new line connects control 106 at 117 to the T connection of two-way check valve 31 the ends of which are connected to forward and reverse air pressure lines 142, 138 respectively as shown.

Referring to Figures 4, 5 and 7 it is seen that with air pressure from line 132a at connection 118 of control 106 and with adjusting screw 112 properly set and with no air pressure on connection 117, piston 108 is held by spring 109 in the downward position shown in Figure 4 which is the condition when master control 130 is set with lever 137 in the neutral position 137a. As explained above for the Figures 5–6 arrangement, when master control 130 is set to this neutral position air pressure is required on line 141, so in the Figures 5–7 arrangement with master control neutral pressure outlet 135 plugged and not used then air pressure is applied to line 141 from line 132a through control 106 from connection 118 to connection 119.

When in the Figures 5–7 arrangement it is desired to shift to either the forward or reverse power drive operation master control lever 137 is shifted to either the position 137b or the position 137 and air pressure is applied to the appropriate line 138 or 142 thus applying appropriate actuating pressure to power cylinder 35 through either relaxing valve 89a or 89. But as described for the Figures 5–6 arrangement for proper operation of the system to the forward or reverse position it is necessary that the air be relaxed or exhausted to atmosphere from line 141. To accomplish this, in the Figures 5–7 arrangement, when air pressure is applied to either line 138 or 142 air from the appropriate line through two-way check valve 31 is applied to the piston operating connection 117 of control 106. This air pressure under head 115 of piston 108 lifts piston 108 against the bias of spring 109 and first closes valve 125—124 to disconnect line 141 from line 132a and then opens valve 127—129 to exhaust line 141 to atmosphere through connection 119 and exhaust port 120.

In the Figures 5–7 arrangement it is thus seen that continuous air line 132a and control 106 at the power location remove the necessity of bringing line 141 to the remote or master control 130 locations, control 106 being responsive to air pressure or its lack in lines 138, 142 to apply pressure to line 141 on its lack or to relax line 141 on the presence of pressure in lines 138 or 142.

Having thus explained some of the objects of the invention, illustrated and described the invented system in two forms, illustrated and described the invented mechanisms required in the systems and described their operation, it is apparent that both the systems and the mechanisms are subject to variations equivalent to and not departing from the teachings of the invention. It is understood that within limits of equivalence these variations are considered to be inclusively defined in the following claims.

We claim:

1. A remote positioning system including in combination: a fluid actuated piston in a cylinder; said piston having a pair of reverse positions and an intermediate neutral position; a pair of valve mechanisms; each of said valve mechanisms having a first fluid connection, a second fluid connection and a fluid exhaust connection; means operable by said piston to connect said first fluid connection with said exhaust connection in each of said pair of valves when said piston is in its neutral position and operable reversely for said valve mechanisms as said piston moves from its neutral position toward one of its reverse positions to block said first connection of one of said valve mechanisms from its said exhaust connection and thereafter to connect its said first connection with its said second connection; a pair of two-way check valves; each of said check valves having a pair of valve ports and a free port; the free ports of said check valves being connected respectively to the interior of said cylinder at the opposite ends thereof; each of said check valves including means movable therein to block one of its said valve ports and connect said free port with the other of its valve ports when fluid pressure is applied to said other of its ports; a pair of fluid conduits respectively connecting one of said valve ports of each of said check valves to said first fluid connections of each of said valve mechanisms; a forward fluid conduit connected to the other valve port of one of said check valves; a reverse fluid conduit connected to the other valve port of the other of said check valves; a neutral fluid conduit connected to both said second fluid connections of said pair of valve mechanisms; a pair of relaxing valves each having a fluid inlet connection, a fluid outlet connection and a fluid exhaust connection; said relaxing valves being connected respectively into said forward and reverse fluid lines through their fluid inlet and fluid outlet connections; each of said relaxing valves including a line valve between its inlet and outlet connections, an exhaust valve between its outlet connections and its exhaust port, adjustable means adapted to bias said line valve toward its open position and said exhaust valve toward its closed position, and means operable by fluid pressure applied at its inlet connection to close said line valve on a pre-set sufficient air pressure at said outlet connection and thereafter to open said exhaust valve; and control means adapted to supply air under pressure to any selected one of said forward, reverse or neutral fluid conduits at one time.

2. The system of claim 1 in which said control means includes a third two-way check valve and a fluid pressure relay valve, the said forward fluid conduit of said system being connected to one valve port of said third check valve and the reverse fluid conduit of said system being connected to the other valve port of said third check valve, said fluid pressure relay having an operating inlet, a pressure fluid inlet, a pressure fluid outlet, an exhaust outlet, a line valve between said pressure fluid inlet and said pressure fluid outlet, an exhaust valve between said pressure fluid outlet and said exhaust outlet, means biasing said line valve toward its open position and said exhaust valve toward its closed position, said operating inlet of said relay being connected to the free port of said third check valve, said pressure fluid inlet being connected at all times to a source of fluid under pressure, said pressure fluid outlet being connected to said neutral fluid conduit of said system, and said relay including means responsive to the presence of fluid under pressure at said operating inlet to first close said line valve against the bias of said biasing means and then open said exhaust valve.

3. In a remote control system for a fluid actuated reversible piston having a forward position, a reverse position and an intermediate neutral position, power application means adapted selectively to apply actuating fluid to either side of said piston, remote control means having forward, reverse and neutral positions and adapted selectively to apply fluid under pressure to said power application means and means interposed between said power application means and said remote control means adapted on a pre-set sufficient fluid pressure on said power application means to terminate the application of fluid pressure to said power application means, said power application means including means responsive to the position of said piston and said remote control means automatically to cause said piston to seek and stop at its neutral position when said remote control means is set at its neutral position.

4. The system of claim 3 in which said remote control means having forward, reverse and neutral positions is adapted selectively to apply power to said power application means when in its forward and reverse positions only and includes automatic means adapted to cooperate with said piston responsive means to apply power to said power application means to cause said piston to seek and stop at its neutral position when said remote control means is not set at either its forward or reverse position.

5. The system of claim 3 in which said means interposed between said power application means and said remote control means adapted on a pre-set sufficient fluid pressure on said power application means to terminate the application of fluid pressure to said power application means includes means adapted below a pre-set pressure at said power application means to open said power application means to said remote control means and above said pre-set pressure at said power application means to isolate said power application means from said remote control means and thereafter on a sufficient rise in pressure from said remote control means to exhaust said power application means to the atmosphere.

6. In a remote control system for a fluid actuated reversible piston have a forward position, a reverse position and an intermediate neutral position, power application means adapted selectively to apply actuating fluid to either side of said piston, remote control means having forward, reverse and neutral positions, adapted selectively to apply fluid under pressure to said power application means and means interposed between said power application means and said remote control means adapted below a pre-set pressure at said power application means to open said power application means to said remote control means and above said pre-set pressure at said power application means to isolate said power application means from said remote control means and thereafter on a sufficient rise in pressure from said remote control means to exhaust said power application means to atmosphere, said power application means including means responsive to the position of said piston and said remote control means automatically to cause said piston to seek and stop at its neutral position when said remote control means is set at its neutral position.

References Cited in the file of this patent

UNITED STATES PATENTS

| 172,934 | Prall | Feb. 1, 1876 |
| 212,972 | Osgood et al. | Mar. 4, 1879 |
| 1,496,391 | Thomas | June 3, 1924 |
| 1,925,610 | Shinn | Sept. 5, 1933 |
| 1,965,070 | Cumming | July 3, 1934 |
| 2,010,329 | Speth | Aug. 6, 1935 |
| 2,040,990 | Haas et al. | May 19, 1936 |
| 2,273,856 | Freygang | Feb. 24, 1942 |
| 2,301,099 | Upp | Nov. 3, 1942 |
| 2,352,470 | Carlton | June 27, 1944 |
| 2,354,791 | Boldt | Aug. 1, 1944 |
| 2,604,075 | Naud | July 22, 1952 |

FOREIGN PATENTS

| 462,487 | France | Jan. 28, 1914 |